US010583832B2

(12) United States Patent
Foster et al.

(10) Patent No.: US 10,583,832 B2
(45) Date of Patent: Mar. 10, 2020

(54) OBSTACLE DETECTION SYSTEM FOR A WORK VEHICLE

(71) Applicants: CNH Industrial America LLC, New Holland, PA (US); Autonomous Solutions, Inc., Mendon, UT (US)

(72) Inventors: Christopher Alan Foster, Mohnton, PA (US); Taylor Chad Bybee, Logan, UT (US); Bret Todd Turpin, Wellsville, UT (US); Chad Brian Jeppesen, Richmond, UT (US); Brad Abram Baillio, Smithfield, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 291 days.

(21) Appl. No.: 15/585,025

(22) Filed: May 2, 2017

(65) Prior Publication Data
US 2018/0319396 A1    Nov. 8, 2018

(51) Int. Cl.
| B60W 30/095 | (2012.01) |
| G05B 19/18 | (2006.01) |
| B60R 21/013 | (2006.01) |
| B60W 30/09 | (2012.01) |
| H04N 7/18 | (2006.01) |
| G05D 1/02 | (2006.01) |
| E02F 9/26 | (2006.01) |
| B60R 1/00 | (2006.01) |
| B62D 15/02 | (2006.01) |

(Continued)

(52) U.S. Cl.
CPC ....... *B60W 30/0956* (2013.01); *A01B 69/001* (2013.01); *B62D 15/0265* (2013.01); *G01S 13/862* (2013.01); *G01S 13/865* (2013.01); *G01S 13/931* (2013.01); *G01S 15/025* (2013.01); *G01S 15/931* (2013.01)

(58) Field of Classification Search
CPC ..... B60W 30/095; B60W 30/09; G05B 19/18; G05D 1/02; E02F 9/26; H04N 7/18; B60R 21/013; B60R 1/00
See application file for complete search history.

(56) References Cited

U.S. PATENT DOCUMENTS

| 4,603,753 A | * | 8/1986 | Yoshimura | ........... G05D 1/0259 180/168 |
| 4,970,653 A | | 11/1990 | Kenue | |

(Continued)

OTHER PUBLICATIONS

Freitas et al., "A Practical Obstacle Detection System for Autonomous Orchard Vehicles," RSJ International Conference on Intelligent Robots and Systems, Oct. 7-12, 2012, pp. 3391-3398, IEEE, Vilamoura, Algarve, Portugal.

*Primary Examiner* — Yuri Kan
(74) *Attorney, Agent, or Firm* — Rebecca L. Henkel; Rickard K. DeMille

(57) ABSTRACT

An obstacle detection system for a work vehicle includes a controller having a memory and a processor. The controller is configured to receive a first signal indicative of a position of an obstacle relative to the work vehicle, to determine whether the position of the obstacle corresponds to a position of a movable object coupled to the work vehicle, and to output a second signal indicative of detection of the obstacle in response to determining that the position of the obstacle does not correspond to the position of the movable object.

20 Claims, 6 Drawing Sheets

(51) Int. Cl.
*A01B 69/00* (2006.01)
*G01S 15/02* (2006.01)
*G01S 15/931* (2020.01)
*G01S 13/931* (2020.01)
*G01S 13/86* (2006.01)

(56) References Cited

U.S. PATENT DOCUMENTS

| | | |
|---|---|---|
| 5,278,423 A | 1/1994 | Wangler et al. |
| 5,479,173 A | 12/1995 | Yoshioka et al. |
| 5,751,211 A | 5/1998 | Shirai et al. |
| 6,163,755 A | 12/2000 | Peer et al. |
| 7,089,110 B2 | 8/2006 | Pechatnikov et al. |
| 8,170,372 B2 | 5/2012 | Kennedy et al. |
| 8,195,358 B2 | 6/2012 | Anderson |
| 8,805,056 B2 | 8/2014 | Bala et al. |
| 8,855,848 B2 | 10/2014 | Zeng |
| 9,129,523 B2 | 9/2015 | Martin |
| 9,415,804 B2 | 8/2016 | Jecker et al. |
| 9,462,748 B2 | 10/2016 | Dollinger et al. |
| 2013/0155240 A1* | 6/2013 | Mitsuta ............ B60R 1/00 348/148 |
| 2014/0118533 A1* | 5/2014 | Chang ............ B60R 1/00 348/118 |
| 2014/0228982 A1* | 8/2014 | Bharwani ......... G05B 19/18 700/56 |
| 2015/0130618 A1 | 5/2015 | Hamminga et al. |
| 2015/0343976 A1* | 12/2015 | Lim ............ G01S 15/931 340/435 |
| 2016/0078764 A1 | 3/2016 | Kiyokawa et al. |
| 2016/0320477 A1 | 11/2016 | Heimberger |
| 2016/0334798 A1 | 11/2016 | Foster et al. |
| 2017/0131722 A1* | 5/2017 | Hiramatsu ......... A01B 69/008 |
| 2017/0139418 A1* | 5/2017 | Hiramatsu ......... B60T 7/22 |
| 2017/0292250 A1* | 10/2017 | Sato ............ E02F 9/26 |
| 2018/0170369 A1* | 6/2018 | Mitchell ......... B62D 15/029 |

\* cited by examiner

OBSTACLE DETECTION SYSTEM FOR A WORK VEHICLE

BACKGROUND

The disclosure relates generally to an obstacle detection system for a work vehicle.

Certain autonomous work vehicles include an obstacle detection system configured to detect obstacles that may encounter the work vehicle (e.g., due to movement of the work vehicle and/or movement of the obstacle). Upon detection of the obstacle, the obstacle detection system may inform an operator of the presence and, in certain configurations, the location of the detected obstacle. The operator may then instruct the autonomous work vehicle to avoid the obstacle. In certain configurations, the obstacle detection system may automatically instruct a movement control system of the autonomous work vehicle to avoid the obstacle (e.g., by instructing the movement control system to stop the autonomous work vehicle, by instructing the movement control system to turn the autonomous work vehicle, etc.). However, certain obstacles detected by the obstacle detection system may not encounter the work vehicle. Accordingly, alerting the operation of such obstacles and/or automatically instructing the movement control system to direct the autonomous work vehicle to avoid such obstacles may reduce the efficiency of autonomous vehicle operations.

BRIEF DESCRIPTION

In one embodiment, an obstacle detection system for a work vehicle includes a controller having a memory and a processor. The controller is configured to receive a first signal indicative of a position of an obstacle relative to the work vehicle, to determine whether the position of the obstacle corresponds to a position of a movable object coupled to the work vehicle, and to output a second signal indicative of detection of the obstacle in response to determining that the position of the obstacle does not correspond to the position of the movable object.

In another embodiment, an obstacle detection system for a first work vehicle system includes a controller comprising a memory and a processor. The controller is configured to output a first signal to a movement control system of the first work vehicle system indicative of instructions to direct the first work vehicle system along a first route through a field, in which the first route is based on a plan. The controller is also configured to receive a second signal indicative of a position of an obstacle relative to the first work vehicle system, and to determine whether the position of the obstacle corresponds to a position of a second work vehicle system following a second route through the field, in which the second route is based on the plan. In addition, the controller is configured to output a third signal indicative of detection of the obstacle in response to determining that the position of the obstacle does not correspond to the position of the second work vehicle system.

In a further embodiment, one or more tangible, non-transitory, machine-readable media include instructions configured to cause a processor to receive a first signal indicative of a position of an obstacle relative to a work vehicle, to determine whether the position of the obstacle corresponds to a position of a movable object coupled to the work vehicle, and to output a second signal indicative of detection of the obstacle in response to determining that the position of the obstacle does not correspond to the position of the movable object.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
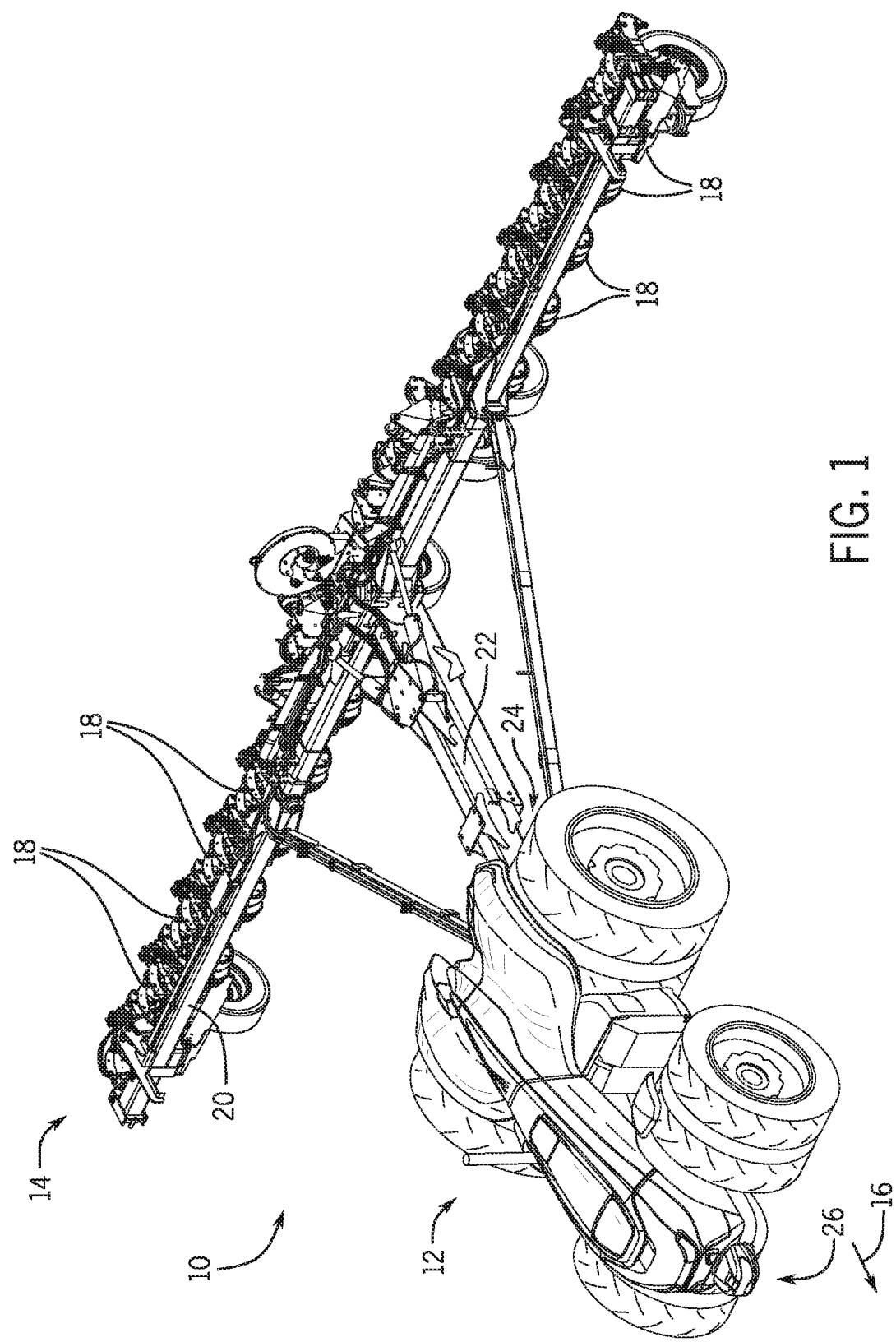
FIG. 1 is a perspective view of an embodiment of an autonomous work vehicle system including an autonomous work vehicle and an agricultural implement coupled to the autonomous work vehicle.

Turning now to the drawings, FIG. 1 is a perspective view of an embodiment of an autonomous work vehicle system 10 including an autonomous work vehicle 12 and an agricultural implement 14 coupled to the autonomous work vehicle 12. The autonomous work vehicle 12 includes a control system configured to automatically guide the autonomous work vehicle system 10 through a field (e.g., along a direction of travel 16) to facilitate agricultural operations (e.g., planting operations, seeding operations, application operations, tillage operations, harvesting operations, etc.). For example, the control system may automatically guide the autonomous work vehicle system 10 along a route through the field without input from an operator. The control system may also automatically guide the autonomous work vehicle system 10 around headland turns between segments of the route.

In the illustrated embodiment, the agricultural implement 14 is a planter having multiple row units 18 distributed along a tool bar 20. Each row unit is configured to open a trench into the soil and deposit agricultural product (e.g., seed, fertilizer, etc.) into the trench, thereby establishing rows of deposited agricultural product. Certain row units may include a closing assembly to direct displaced soil into the trench and/or a packer wheel to pack soil onto the deposited agricultural product. The number of row units 18 mounted on the tool bar 20 and/or a length of the tool bar 20 may be particularly selected (e.g., based on a target row spacing, a size of the agricultural field, etc.). In the illustrated embodiment, the agricultural implement 14 includes a tow bar 22 extending between the tool bar 20 and a hitch assembly 24. The hitch assembly 24 is configured to couple the agricultural implement to a corresponding hitch assembly of the autonomous work vehicle 12. While a planter is coupled to the autonomous work vehicle 12 in the illustrated embodiment, other agricultural implements may be coupled to the autonomous work vehicle in other embodiments. For example, in certain embodiments, a seeder, an air cart, a mower, a tillage tool, a sprayer, or a combination thereof, among other suitable agricultural implements, may be coupled to the autonomous work vehicle.

In the illustrated embodiment, the autonomous work vehicle 12 includes a sensor assembly 26 configured to output a signal indicative of a position of an obstacle relative to the autonomous work vehicle 12. The sensor assembly 26 may include one or more image sensors (e.g., camera(s), etc.), one or more infrared sensors, one or more capacitance sensors, one or more ultrasonic sensors, one or more light detection and ranging (LIDAR) sensors, one or more radio detection and ranging (RADAR) sensors, or a combination thereof, among other suitable types of sensors. While the illustrated sensor assembly 26 is coupled to a front portion of the autonomous work vehicle 12 in the illustrated embodiment, in other embodiments the sensor assembly may be positioned at another suitable location on the autonomous work vehicle, or the sensor assembly may include sensors distributed throughout the autonomous work vehicle. For example, in certain embodiments, the sensor assembly may include one or more sensors coupled to a front portion of the autonomous work vehicle and one or more sensors coupled to at least one side of the autonomous work vehicle.

In certain embodiments, the sensor assembly 26 is an element of an obstacle detection system. The obstacle detection system may also include a controller configured to receive a first signal (e.g., from the sensor assembly 26) indicative of a position of an obstacle relative to the autonomous work vehicle 12. The controller may determine whether the position of the obstacle corresponds to a position of a movable object coupled to the work vehicle 12, such as the agricultural implement 14. The controller may then output a second signal indicative of detection of the obstacle in response to determining that the position of the obstacle does not correspond to the position of the movable object. For example, if the autonomous work vehicle approaches an obstacle (e.g., tree) along the direction of travel, the sensor assembly may output a first signal indicative of a position of the tree relative to the autonomous work vehicle. The controller may then compare the position of the tree to the position of the movable object (e.g., agricultural implement 14). Because the position of the tree is different than the position of the agricultural implement, the controller may output a second signal indicative of detection of the tree. The second signal may include instructions to a movement control system of the autonomous work vehicle to avoid the tree. However, if a portion of the agricultural implement enters a field of view of the sensor assembly (e.g., during a headland turn, etc.), the sensor assembly may output a first signal indicative of the position of the agricultural implement relative to the work vehicle. The controller may then compare the position of the agricultural implement as detected by the sensor assembly to the position of the agricultural implement (e.g., as determined by the controller based on steering angle, dimensions of the agricultural implement, mounting location of the agricultural implement on the autonomous work vehicle, etc.). Because the positions correspond to one another, the second signal indicative of obstacle detection may not be output by the controller. As a result, the movement control system of the work vehicle may not be instructed to avoid the obstacle, thereby increasing the efficiency of agricultural operations.

Figure 2:
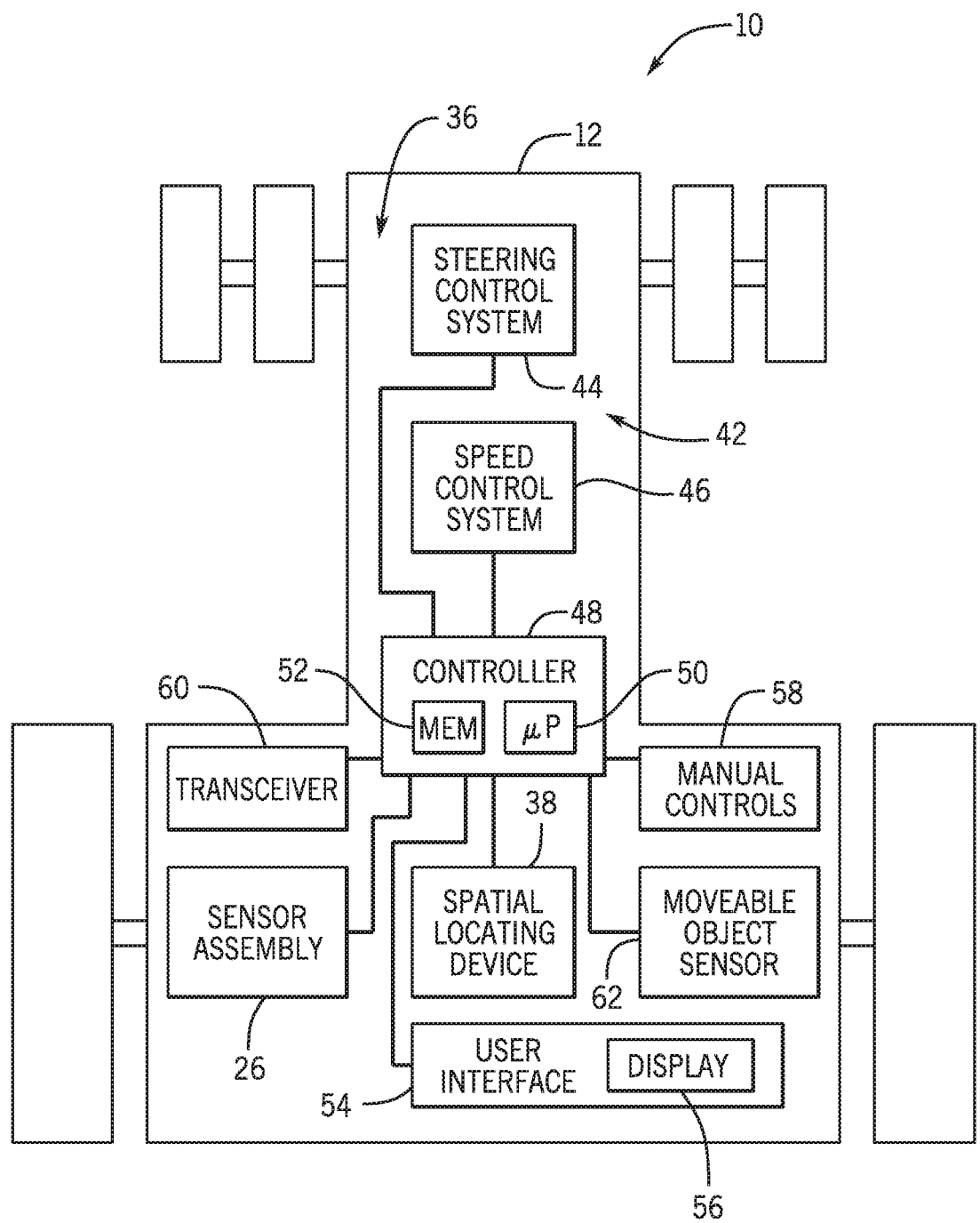
FIG. 2 is a block diagram of an embodiment of a control system that may be employed within the autonomous work vehicle system of FIG. 1.

FIG. 2 is a block diagram of an embodiment of a control system 36 (e.g., obstacle detection system) that may be employed within the autonomous work vehicle system 10 of FIG. 1. In the illustrated embodiment, the control system 36 includes a spatial locating device 38, which is mounted to the autonomous work vehicle 12 and configured to determine a position and, in certain embodiments, a velocity of the autonomous work vehicle 12. The spatial locating device 38 may include any suitable system configured to measure and/or determine the position of the autonomous work vehicle 12, such as a GPS receiver, for example.

In the illustrated embodiment, the control system 36 includes a movement control system 42 having a steering control system 44 configured to control a direction of movement of the autonomous work vehicle 12 and a speed control system 46 configured to control a speed of the autonomous work vehicle 12. In addition, the control system 36 includes a controller 48, which is communicatively coupled to the spatial locating device 38, to the steering control system 44, and to the speed control system 46. The controller 48 is configured to automatically control the autonomous work vehicle during certain phases of agricultural operations (e.g., without operator input, with limited operator input, etc.).

In certain embodiments, the controller 48 is an electronic controller having electrical circuitry configured to process data from the spatial locating device 38 and/or other components of the control system 36. In the illustrated embodiment, the controller 48 include a processor, such as the illustrated microprocessor 50, and a memory device 52. The controller 48 may also include one or more storage devices and/or other suitable components. The processor 50 may be used to execute software, such as software for controlling the autonomous work vehicle, software for determining a position of an obstacle, and so forth. Moreover, the processor 50 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory device 52 may include a volatile memory, such as random access memory (RAM), and/or a nonvolatile memory, such as read-only memory (ROM). The memory device 52 may store a variety of information and may be used for various purposes. For example, the memory device 52 may store processor-executable instructions (e.g., firmware or software) for the processor 50 to execute, such as instructions for controlling the autonomous work vehicle, instructions for determining a position of an obstacle, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the autonomous work vehicle, etc.), and any other suitable data.

In certain embodiments, the steering control system 44 may include a wheel angle control system, a differential braking system, a torque vectoring system, or a combination thereof. The wheel angle control system may automatically rotate one or more wheels and/or tracks of the autonomous work vehicle (e.g., via hydraulic actuators) to steer the autonomous work vehicle along a target route (e.g., along a guidance swath, along headline turns, etc.). By way of example, the wheel angle control system may rotate front wheels/tracks, rear wheels/tracks, intermediate wheels/tracks, or a combination thereof, of the autonomous work vehicle (e.g., either individually or in groups). The differential braking system may independently vary the braking force on each lateral side of the autonomous work vehicle to direct the autonomous work vehicle along a path. In addition, the torque vectoring system may differentially apply torque from an engine to wheel(s) and/or track(s) on each lateral side of the autonomous work vehicle, thereby directing the autonomous work vehicle along a path. In further embodiments, the steering control system may include other and/or additional systems to facilitate directing the autonomous work vehicle along a path through the field.

In certain embodiments, the speed control system 46 may include an engine output control system, a transmission control system, a braking control system, or a combination thereof. The engine output control system may vary the output of the engine to control the speed of the autonomous work vehicle. For example, the engine output control system may vary a throttle setting of the engine, a fuel/air mixture of the engine, a timing of the engine, other suitable engine parameters to control engine output, or a combination thereof. In addition, the transmission control system may adjust a gear ratio of a transmission (e.g., by adjusting gear selection in a transmission with discrete gears, by controlling a continuously variable transmission (CVT), etc.) to control the speed of the autonomous work vehicle. Furthermore, the braking control system may adjust braking force, thereby controlling the speed of the autonomous work vehicle. In further embodiments, the speed control system may include other and/or additional systems to facilitate adjusting the speed of the autonomous work vehicle.

In certain embodiments, the control system may also control operation of the agricultural implement coupled to the autonomous work vehicle. For example, the control system may include an implement control system/implement controller configured to control a steering angle of the implement (e.g., via an implement steering control system having a wheel angle control system and/or a differential braking system) and/or a speed of the autonomous work vehicle system (e.g., via an implement speed control system having a braking control system). In such embodiments, the autonomous work vehicle control system may be communicatively coupled to a control system/controller on the implement via a communication network, such as a controller area network (CAN bus).

In the illustrated embodiment, the control system 36 includes a user interface 54 communicatively coupled to the controller 48. The user interface 54 is configured to enable an operator to control certain parameter(s) associated with operation of the autonomous work vehicle. For example, the user interface 54 may include a switch that enables the operator to selectively configure the autonomous work vehicle for autonomous or manual operation. In addition, the user interface 54 may include a battery cut-off switch, an engine ignition switch, a stop button, or a combination thereof, among other controls. In certain embodiments, the user interface 54 includes a display 56 configured to present information to the operator, such as a graphical representation of a guidance swath, a visual representation of certain parameter(s) associated with operation of the autonomous work vehicle (e.g., fuel level, oil pressure, water temperature, etc.), a visual representation of certain parameter(s) associated with operation of the agricultural implement coupled to the autonomous work vehicle (e.g., seed level, penetration depth of ground engaging tools, orientation(s)/position(s) of certain components of the implement, etc.), or a combination thereof, among other information. In certain embodiments, the display 56 may include a touch screen interface that enables the operator to control certain parameters associated with operation of the autonomous work vehicle and/or the agricultural implement.

In the illustrated embodiment, the control system 36 includes manual controls 58 configured to enable an operator to control the autonomous work vehicle while automatic control is disengaged (e.g., while unloading the autonomous work vehicle from a trailer, etc.). The manual controls 58 may include manual steering control, manual transmission control, manual braking control, or a combination thereof, among other controls. In the illustrated embodiment, the manual controls 58 are communicatively coupled to the controller 48. The controller 48 is configured to disengage automatic control of the autonomous work vehicle upon receiving a signal indicative of manual control of the autonomous work vehicle. Accordingly, if an operator controls the autonomous work vehicle manually, the automatic control terminates, thereby enabling the operator to control the autonomous work vehicle.

In the illustrated embodiment, the control system 36 includes a transceiver 60 communicatively coupled to the controller 48. In certain embodiments, the transceiver 60 is configured to establish a communication link with a corresponding transceiver of a base station, thereby facilitating communication between the base station and the control system of the autonomous work vehicle. For example, the base station may include a user interface that enables a remote operator to provide instructions to the control system (e.g., instructions to initiate automatic control of the autonomous work vehicle, instructions to direct the autonomous work vehicle along a route, etc.). The user interface may also enable a remote operator to provide data to the control system. The transceiver 60 may operate at any suitable frequency range within the electromagnetic spectrum. For example, in certain embodiments, the transceiver 60 may broadcast and receive radio waves within a frequency range of about 1 GHz to about 10 GHz. In addition, the transceiver 60 may utilize any suitable communication protocol, such as a standard protocol (e.g., Wi-Fi, Bluetooth, etc.) or a proprietary protocol.

In certain embodiments, the control system may include other and/or additional controllers/control systems, such as the implement controller/control system discussed above. For example, the implement controller/control system may be configured to control various parameters of an agricultural implement towed by the autonomous work vehicle. In certain embodiments, the implement controller/control system may be configured to instruct actuator(s) to adjust a penetration depth of at least one ground engaging tool of the agricultural implement. By way of example, the implement controller/control system may instruct actuator(s) to reduce or increase the penetration depth of each tillage point on a tilling implement, or the implement controller/control system may instruct actuator(s) to engage or disengage each opener disc/blade of a seeding/planting implement from the soil. Furthermore, the implement controller/control system may instruct actuator(s) to transition the agricultural implement between a working position and a transport portion, to adjust a flow rate of product from the agricultural implement, or to adjust a position of a header of the agricultural implement (e.g., a harvester, etc.), among other operations. The autonomous work vehicle control system may also include controller(s)/control system(s) for electrohydraulic remote(s), power take-off shaft(s), adjustable hitch(es), or a combination thereof, among other controllers/control systems.

In the illustrated embodiment, the control system 36 includes the sensor assembly 26 communicatively coupled to the controller 48 and configured to output a signal indicative of a position of an obstacle relative to the autonomous work vehicle 12. As previously discussed, the sensor assembly 26 may include one or more image sensors (e.g., camera(s), etc.), one or more infrared sensors, one or more capacitance sensors, one or more ultrasonic sensors, one or more LIDAR sensors, one or more RADAR sensors, or a combination thereof, among other suitable types of sensors. In certain embodiments, the controller 48 is configured to receive a first signal (e.g., from the sensor assembly 26) indicative of a position of an obstacle relative to the autonomous work vehicle 12. The controller 48 is also configured to determine whether the position of the obstacle corresponds to a position of a movable object coupled to the autonomous work vehicle 12 (e.g., the agricultural implement). In addition, the controller 48 is configured to output a second signal indicative of detection of the obstacle in response to determining that the position of the obstacle does not correspond to the position of the movable object (e.g., the agricultural implement). However, if the position of the obstacle corresponds to the position of the movable object (e.g., the agricultural implement), the controller may not output a signal indicative of detection of the obstacle.

In certain embodiments, the second signal indicative of detection of the obstacle includes instruction to the movement control system 42 to avoid the obstacle. For example, the controller 48 may output the second signal to the steering control system 44 indicative of instructions to steer the autonomous work vehicle system around the obstacle. In addition, the controller 48 may output the second signal to the speed control system 46 indicative of instructions to stop the autonomous work vehicle system or reduce the speed of the work vehicle system to avoid a moving obstacle.

In the illustrated embodiment, the control system 36 includes a movable object sensor 62 communicatively coupled to the controller 48 and configured to output a signal indicative of the position of the movable object relative to the autonomous work vehicle 12. In certain embodiments, the movable object sensor 62 may include a potentiometer, an ultrasonic sensor, an infrared sensor, an image sensor, a capacitance sensor, or a combination thereof, among other suitable types of sensors. For example, the movable object sensor may be configured to output a signal indicative of an angle of the agricultural implement relative to the autonomous work vehicle. The controller 48 may be configured to determine the position of the agricultural implement based at least in part on the dimensions of the agricultural implement, the mounting location of the agricultural implement on the autonomous work vehicle, and the angle of the agricultural implement relative to the autonomous work vehicle. As previously discuss, the position of the agricultural implement may be compared to the position of a detected obstacle to determine whether the detected obstacle corresponds to the agricultural implement. In certain embodiments, the angle of the agricultural implement relative to the autonomous work vehicle may be determined based on steering angle of the autonomous work vehicle. In such embodiments, the movable object sensor may be omitted.

Figure 3:
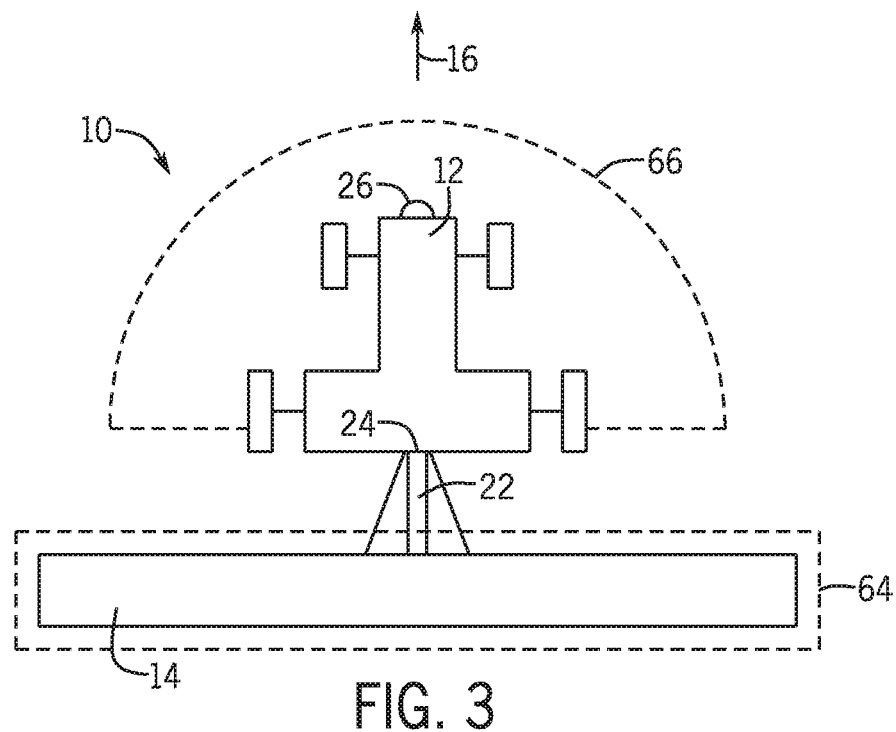
FIG. 3 is a schematic diagram of an embodiment of the autonomous work vehicle system of FIG. 1, in which the autonomous work vehicle is moving along a direction of travel.

FIG. 3 is a schematic diagram of an embodiment of the autonomous work vehicle system 10 of FIG. 1, in which the autonomous work vehicle 12 is moving along the direction of travel 16. In the illustrated embodiment, the controller is configured to generate a bounding polytope around the agricultural implement 14 based at least in part on the dimensions of the agricultural implement 14. The dimensions of the agricultural implement 14 may be manually input via the user interface, or the controller may automatically receive the dimensions from a base station or from a controller of the agricultural implement (e.g., via a communication link between the agricultural implement controller and the autonomous work vehicle controller). While the illustrated bounding polytope 64 is two-dimensional (e.g., a polygon), in alternative embodiments the controller may generate a three-dimensional bounding polytope (e.g., a polyhedron). In addition, while the illustrated bounding polytope 64 is rectangular in the illustrated embodiment, in alternative embodiments the bounding polytope may include more sides/surfaces to correspond to the detailed geometry of the agricultural implement.

As illustrated, with the autonomous work vehicle 12 moving along a substantially straight path in the direction of travel 16, the agricultural implement 14 is positioned behind the autonomous work vehicle 12. Accordingly, the agricultural implement 14 is not within a field of view 66 of the sensor assembly 26. However, if an obstacle is present within the field of view 66 of the sensor assembly 26, the sensor assembly 26 outputs a signal to the controller indicative of the position of the obstacle relative to the autonomous work vehicle 12. The controller then determines the position of the bounding polytope 64 (e.g., based on the steering angle of the autonomous work vehicle, a signal from the movable object sensor, the configuration of the agricultural implement, the location of the hitch assembly, or a combination thereof, among other data/information/signal(s)). Next, the controller determines whether the position of the obstacle corresponds to the position of the bounding polytope. If the position of the obstacle does not correspond to the position of the bounding polytope, the controller outputs a signal indicative of detection of the obstacle. The signal indicative of detection of the obstacle may include instructions to inform an operator (e.g., via the user interface) of the presence and, in certain embodiments, position of the obstacle. In addition, the signal indicative of detection of the obstacle may include instructions to the movement control system to avoid the obstacle. For example, the instructions may include instructions to the speed control system to stop the autonomous work vehicle, or the instructions may include instructions to the steering control system to direct the autonomous work vehicle system around the obstacle (e.g., in combination with instructions to the speed control system to reduce the speed of the autonomous work vehicle).

Figure 4:
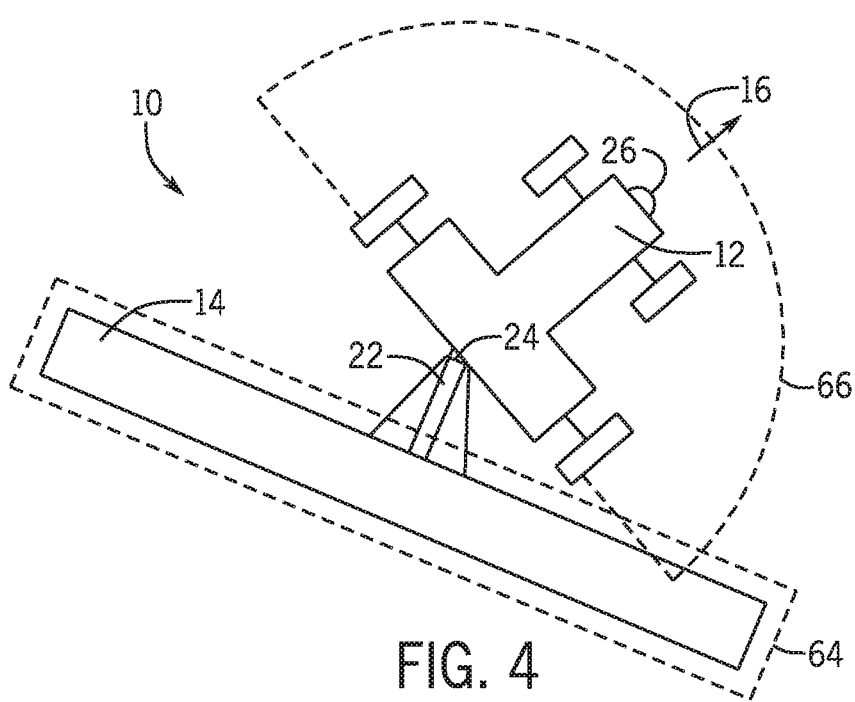
FIG. 4 is a schematic diagram of the autonomous work vehicle system of FIG. 2, in which the autonomous work vehicle is turning.

FIG. 4 is a schematic diagram of the autonomous work vehicle system 10 of FIG. 2, in which the autonomous work vehicle 12 is turning. As illustrated, with the autonomous work vehicle 12 in a turn, a portion of the agricultural implement 14 is positioned within the field of view 66 of the sensor assembly 26. Accordingly, the sensor assembly 26 outputs a signal indicative of the position of the detected portion of the agricultural implement 14. The controller receives the signal from the sensor assembly 26 and determines whether the position of the detected obstacle corresponds to the position of the agricultural implement. For example, the controller may determine the position of the bounding polytope 64 (e.g., based on the steering angle of the autonomous work vehicle, a signal from the movable object sensor, the configuration of the agricultural implement, the location of the hitch assembly, or a combination thereof, among other data/information/signal(s)). The controller then determines whether the position of the detected obstacle corresponds to the position of the bounding polytope. As illustrated, the position of the detected obstacle corresponds to the position of the agricultural implement because the detected obstacle is a portion of the agricultural implement. Accordingly, the signal indicative of detection of the obstacle is not output by the controller.

In certain embodiments, the controller is configured to identify the detected obstacle in response to determining that the position of the obstacle does not correspond to the position of the agricultural implement. The obstacle identification process may include comparing the data received from the sensor assembly to data stored within the memory and/or storage device of the controller (e.g., associated with various types of objects). The obstacle identification process may facilitate determination of an effective response to detecting the obstacle (e.g., stopping the autonomous work vehicle, directing the autonomous work vehicle system around the detected obstacle, informing an operator of the detected obstacle, etc.). However, the obstacle identification process may be computationally intensive, thereby utilizing a significant portion of the computational resources of the controller. Accordingly, if the position of the detected obstacle corresponds to the position of the agricultural implement, the identification process may not be performed because the detected obstacle corresponds to the agricultural implement. As a result, availability of the computational resources of the controller may be enhanced. In addition, because the signal indicative of detection of the obstacle is not output by the controller when the obstacle corresponds to the agricultural implement, the efficiency of the agricultural operations may be enhanced (e.g., because the operator is not informed of the obstacle detection, because the movement control system does not direct the autonomous work vehicle to avoid the obstacle, etc.).

While the controller utilizes bounding polytopes in the illustrated embodiment to determine whether the position of the obstacle corresponds to the position of the agricultural implement, in alternative embodiments the controller may utilize other bounding shapes (e.g., shapes having curved lines, etc.) or non-bounding shapes (e.g., one or more flat planes, etc.) to determine whether the position of the obstacle corresponds to the position of the implement. Furthermore, while the autonomous work vehicle system disclosed above includes an agricultural implement, the autonomous work vehicle system may include other and/or additional movable objects coupled to the autonomous work vehicle. For example, a movable bucket (e.g., loader) may be coupled to a front portion of the autonomous work vehicle. If the movable bucket enters the field of view of the sensor assembly, the sensor assembly may output a signal indicative of the position of a detected obstacle. The controller may then receive the signal and determine whether the position of the obstacle corresponds to the position of the bucket (e.g., based on a bucket position sensor, utilizing a bounding polytope, etc.). Because the position of the detected obstacle corresponds to the position of the movable bucket, the controller may not output a signal indicative of detection of the obstacle, thereby increasing efficiency of autonomous vehicle operations.

Figure 5:
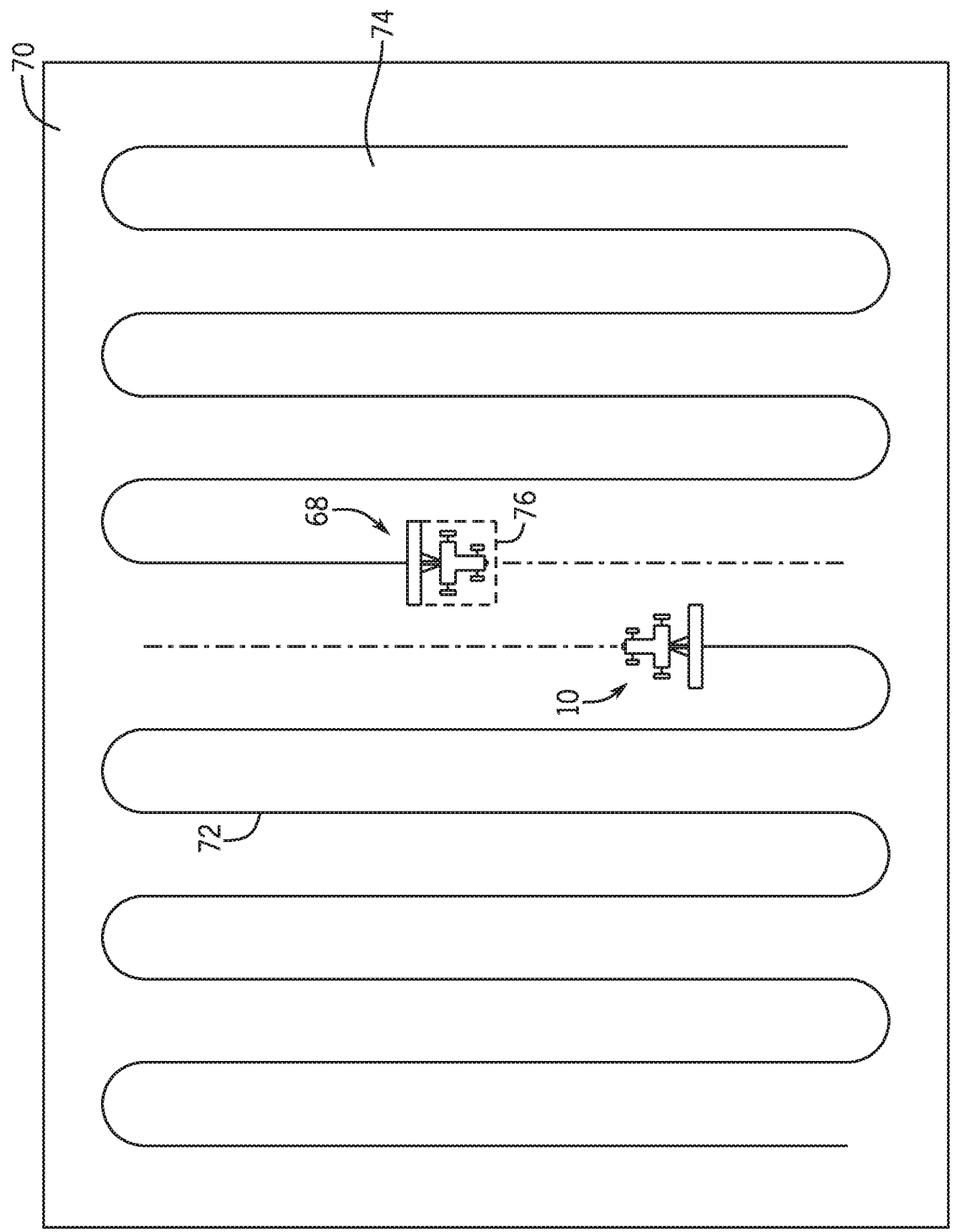
FIG. 5 is a schematic diagram of an embodiment of the autonomous work vehicle system of FIG. 1 and a second autonomous work vehicle system within a field.

FIG. 5 is a schematic diagram of an embodiment of the autonomous work vehicle system 10 of FIG. 1 (e.g., first autonomous work vehicle system) and a second autonomous work vehicle system 68 (e.g., including a second autonomous work vehicle and a second agricultural implement coupled to the second autonomous work vehicle) within a field 70. In certain embodiments, the controller of the first autonomous work vehicle system 10 is configured to output a signal to the movement control system (e.g., the speed control system and/or the steering control system) indicative of instructions to direct the first autonomous work vehicle system 10 along a first route 72 through the field 70. In addition, the controller of the second autonomous work vehicle system 68 is configured to output a signal to the respective movement control system (e.g., the speed control system and/or the steering control system) indicative of instructions to direct the second work vehicle system 68 along a second route 74 through the field 70. The first and second routes may be based on a plan to perform an agricultural operation (e.g., tillage, planting, harvesting, etc.) on the field 70. For example, a base station controller may determine the plan, and then output signals indicative of the first and second routes to the controllers of the autonomous work vehicle systems. In addition or alternatively, the autonomous work vehicle system controllers may output signals indicative of the respective routes to one another (e.g., in which the routes are based on the plan). While two autonomous work vehicle systems are positioned within the field in the illustrated embodiment, in alternative embodiments more autonomous work vehicle systems may be positioned within the field (e.g., each receiving a respective route based on the plan).

As the first autonomous work vehicle system 10 approaches the second autonomous work vehicle system 68, the controller of the first autonomous work vehicle system 10 may receive a signal indicative of a position of an obstacle (e.g., the second autonomous work vehicle system 68) relative to the first autonomous work vehicle system 10. The controller of the first autonomous work vehicle system 10 may then determine whether the position of the obstacle corresponds to a position of the second autonomous work vehicle system 68. For example, the controller of the first autonomous work vehicle system 10 may determine the position of the second autonomous work vehicle system 68 based on the second route 74, which may be output from the base station controller and/or the second autonomous work vehicle system controller to the controller of the first autonomous work vehicle system 10. In addition or alternatively, the controller of the first autonomous work vehicle system 10 may determine the position of the second autonomous work vehicle system 68 based on a signal indicative of the position of the second autonomous work vehicle system 68, which may be output from the base station controller and/or the second autonomous work vehicle system controller to the controller of the first autonomous work vehicle system 10. Because the position of the detected obstacle corresponds to the position of the second autonomous work vehicle system, the controller of the first autonomous work vehicle system does not output a signal indicative of detection of the obstacle. However, if the position of an obstacle does not correspond to the position of the second autonomous work vehicle system, the controller of the first autonomous work vehicle system may output a signal indicative of detection of the obstacle. The signal indicative of detection of the obstacle may include instructions to inform an operator (e.g., via the user interface) of the presence and, in certain embodiments, position of the obstacle. In addition, the signal indicative of detection of the obstacle may include instructions to the movement control system of the first autonomous work vehicle system to avoid the obstacle. For example, the instructions may include instructions to the speed control system to stop the autonomous work vehicle, or the instructions may include instructions to the steering control system to direct the autonomous work vehicle system around the obstacle (e.g., in combination with instructions to the speed control system to reduce the speed of the autonomous work vehicle).

In certain embodiments, the controller of the first autonomous work vehicle system 10 may generate a bounding polytope 76 (e.g., two-dimensional polygon or three-dimensional polyhedron) around the second autonomous work vehicle system 68 (e.g., based on dimensions of the second autonomous work vehicle system, dimensions of the second autonomous work vehicle, dimensions of the second agricultural implement, configuration of the second agricultural implement, etc.). The controller may then determine a position of the bounding polytope (e.g., based at least in part on the second route and/or a signal indicative of the position of the second autonomous work vehicle system). Next, the controller may determine whether the position of the obstacle corresponds to the position of the second autonomous work vehicle system based at least in part on the position of the bounding polytope (e.g., by comparing the position of the obstacle to the position of the bounding polytope). As previously discussed, the controller may output a signal indicative of detection of the obstacle in response to determining that the position of the obstacle does not correspond to the position of the second autonomous work vehicle system.

As previously discussed, the controller does not output a signal indicative of detection of the obstacle if the position of the obstacle corresponds to the position of the second autonomous work vehicle system. For example, the first and second routes may be determined based on the plan, such that the first and second autonomous agricultural work vehicle systems cover non-overlapping portions of the field. Because the portions of the field covered by the autonomous work vehicle systems do not overlap, the autonomous work vehicle systems avoid one another without control input from the obstacle detection system.

In certain embodiments, the controller is configured to identify the detected obstacle in response to determining that the position of the obstacle does not correspond to the position of the second autonomous work vehicle system. The obstacle identification process may include comparing the data received from the sensor assembly to data stored within the memory and/or storage device of the controller (e.g., associated with various types of objects). The obstacle identification process may facilitate determination of an effective response to detecting the obstacle (e.g., stopping the first autonomous work vehicle system, directed the first autonomous work vehicle system around the detected obstacle, informing an operator of the detected obstacle, etc.). However, the obstacle identification process may be computationally intensive, thereby utilizing a significant portion of the computational resources of the controller. Accordingly, if the position of the detected obstacle corresponds to the position of the second autonomous work vehicle system, the identification process may not be performed because the detected obstacle corresponds to the second autonomous work vehicle system. As a result, availability of the computational resources of the controller may be enhanced. In addition, because the signal indicative of detection of the obstacle is not output by the controller when the obstacle corresponds to the second autonomous work vehicle system, the efficiency of the agricultural operations may be enhanced (e.g., because the operator is not informed of the obstacle detection, because the movement control system does not direct the first autonomous work vehicle to avoid the obstacle, etc.).

While the first and second routes through the field are based on the plan in the embodiment disclosed above, in certain embodiments the first and second routes may be determined independently of one another. In such embodiments, the second autonomous work vehicle system controller may output a signal indicative of the second route to the controller of the first autonomous work vehicle system. The controller of the first autonomous work vehicle system may determine the position of the second autonomous work vehicle system based on the second route. If the position of the second autonomous work vehicle system corresponds to the position of a detected obstacle, and the first and second routes do not cause areas covered by the autonomous work vehicle systems (e.g., bounding polytopes) to overlap within a region proximate to the autonomous work vehicle systems, the controller of the first autonomous work vehicle system may not output a signal indicative of detection of the obstacle.

Figure 6:
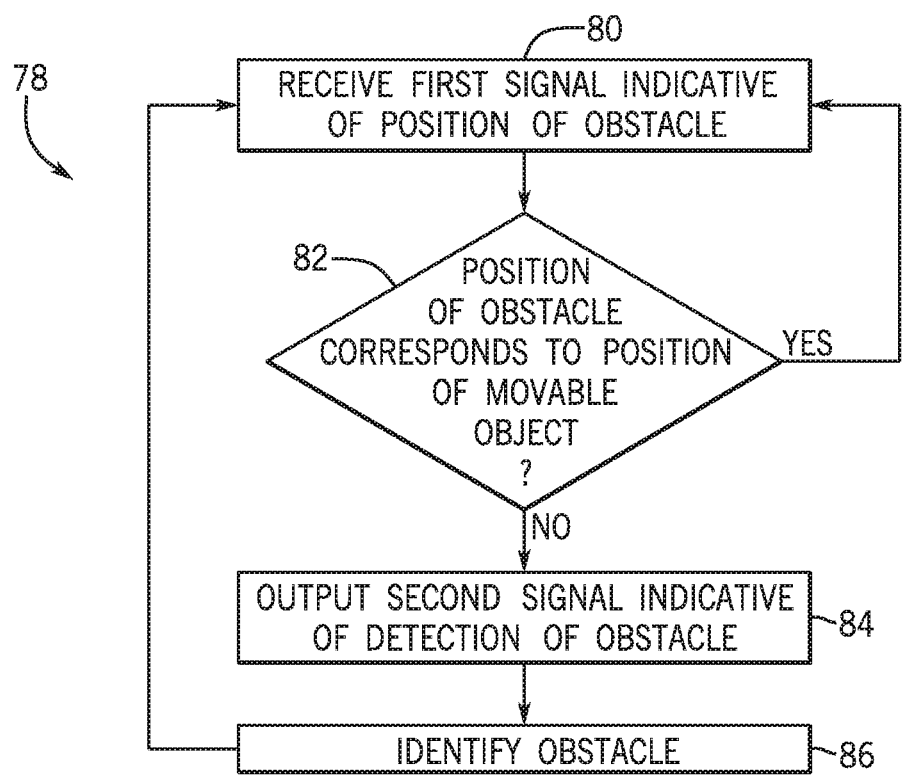
FIG. 6 is a flow diagram of an embodiment of a method for detecting an obstacle.

FIG. 6 is a flow diagram of an embodiment of a method 78 for detecting an obstacle. First, as represented by block 80, a first signal indicative of a position of an obstacle relative to the autonomous work vehicle is detected. As previously discussed, the first signal may be received from a sensor assembly, which may include one or more image sensors (e.g., camera(s), etc.), one or more infrared sensors, one or more capacitance sensors, one or more ultrasonic sensors, one or more LIDAR sensors, one or more RADAR sensors, or a combination thereof, among other suitable types of sensors. Next, as represented by block 82, a determination is made regarding whether the position of the obstacle corresponds to a position of a movable object coupled to the autonomous work vehicle (e.g., an agricultural implement, a movable bucket, etc.). For example, in certain embodiments, a bounding polytope around the movable object may be generated based at least in part on dimensions of the movable object, and a position of the bounding polytope may be determined. In such embodiments, the determination of whether the position of the obstacle corresponds to the position of the movable object is based at least in part on the position of the bounding polytope (e.g., the position of the bounding polytope may be compared to the position of the obstacle).

As represented by block 84, a second signal indicative of detection of the obstacle is output in response to determining that the position of the obstacle does not correspond to the position of the movable object. Otherwise, the process may return to block 80. As previously discussed, the second signal indicative of detection of the obstacle may include instructions to inform an operator (e.g., via the user interface) of the presence and, in certain embodiments, position of the obstacle. In addition, the second signal indicative of detection of the obstacle may include instructions to the movement control system to avoid the obstacle. In certain embodiments, the obstacle may be identified in response to determining that the position of the obstacle does not correspond to the position of the movable object, as represented by block 86. For example, the obstacle identification process may include comparing data received from the sensor assembly to data stored within the memory and/or storage device of the controller (e.g., associated with various types of objects).

Figure 7:
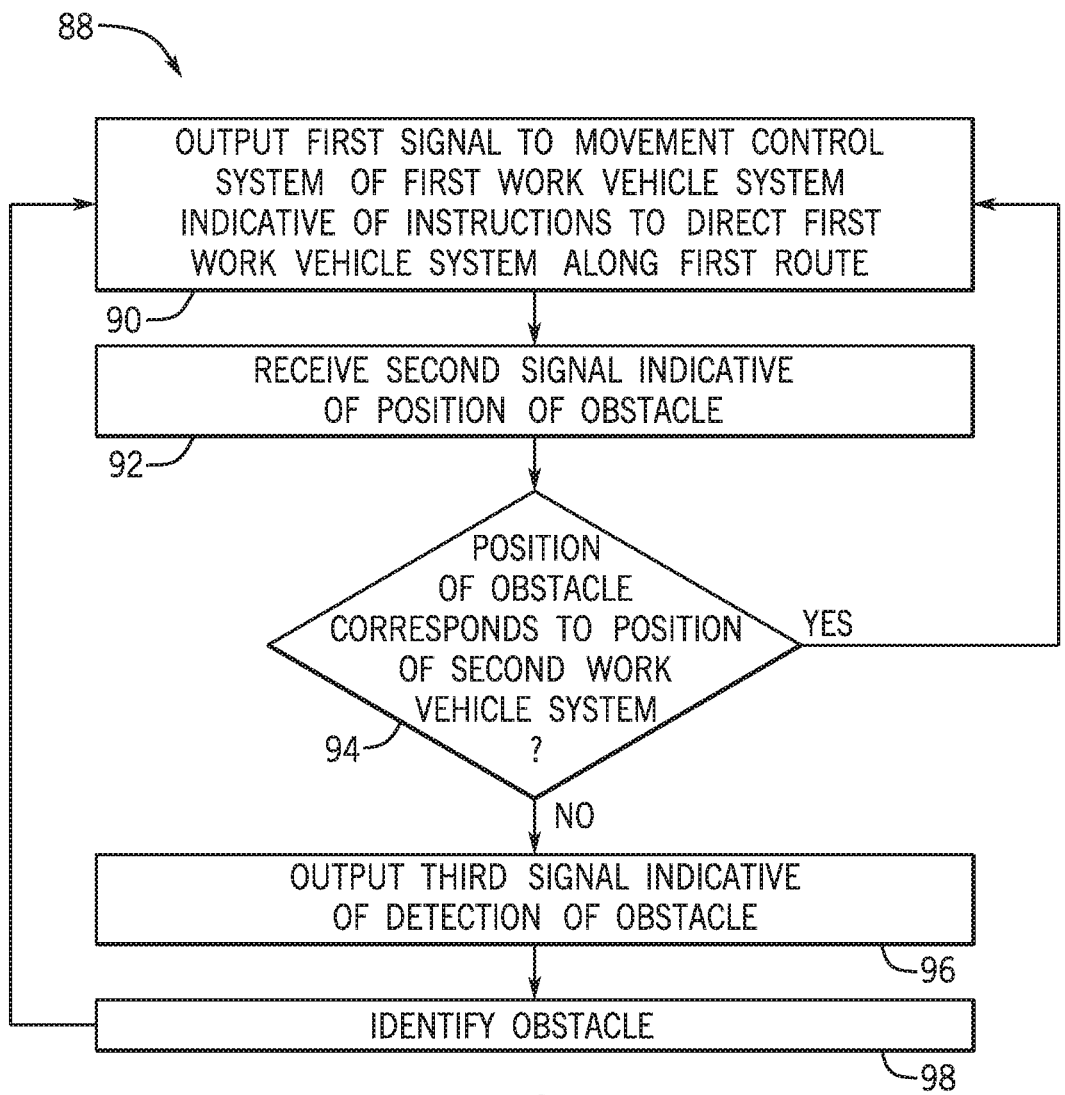
FIG. 7 is a flow diagram of another embodiment of a method for detecting an obstacle.

FIG. 7 is a flow diagram of another embodiment of a method 88 for detecting an obstacle. First, as represented by block 90, a first signal indicative of instructions to direct a first work vehicle system along a first route through a field is output to a movement control system. As previously discussed, the first route is based on a plan, and the movement control system may include a steering control system and/or a speed control system. Next, a second signal indicative of a position of an obstacle relative to the first work vehicle system is received, as represented by block 92. As previously discussed, the second signal may be received from a sensor assembly, which may include one or more image sensors (e.g., camera(s), etc.), one or more infrared sensors, one or more capacitance sensors, one or more ultrasonic sensors, one or more LIDAR sensors, one or more RADAR sensors, or a combination thereof, among other suitable types of sensors. Next, as represented by block 94, a determination is made regarding whether the position of the obstacle corresponds to a position of a second autonomous work vehicle system following a second route through the field, in which the second route is also based on the plan. For example, in certain embodiments, a bounding polytope around the second autonomous work vehicle system may be generated based at least in part on dimensions of the second autonomous work vehicle system, and a position of the bounding polytope may be determined. In such embodiments, the determination of whether the position of the obstacle corresponds to the position of the second autonomous work vehicle system is based at least in part on the position of the bounding polytope (e.g., the position of the bounding polytope may be compared to the position of the obstacle).

As represented by block 96, a third signal indicative of detection of the obstacle is output in response to determining that the position of the obstacle does not correspond to the position of the second autonomous work vehicle system. Otherwise, the process may return to block 90. As previously discussed, the third signal indicative of detection of the obstacle may include instructions to inform an operator (e.g., via the user interface) of the presence and, in certain embodiments, position of the obstacle. In addition, the third signal indicative of detection of the obstacle may include instructions to the movement control system to avoid the obstacle. In certain embodiments, the obstacle may be identified in response to determining that the position of the obstacle does not correspond to the position of the second autonomous work vehicle system, as represented by block 98. For example, the obstacle identification process may include comparing data received from the sensor assembly to data stored within the memory and/or storage device of the controller (e.g., associated with various types of objects).

While the signal indicative of the position of the obstacle relative to the work vehicle is received from a sensor assembly coupled to the autonomous work vehicle in the embodiments disclosed above, in certain embodiments the signal may be received from another sensor assembly. For example, in certain embodiments, one or more stationary sensor assemblies may be distributed throughout the field and configured to output a signal indicative of the position of the obstacle relative to the autonomous work vehicle (e.g., the stationary sensor assembly may provide the position of the obstacle in global or field coordinates, and the controller may determine the position of the obstacle relative to the autonomous work vehicle based on the position of the autonomous work vehicle in global or field coordinates). In further embodiments, one or more sensor assemblies mounted to other vehicles (e.g., other autonomous work vehicles) in the field may be configured to output a signal indicative of the position of the obstacle relative to the autonomous work vehicle (e.g., the vehicle-mounted sensor assembly may provide the position of the obstacle relative to the vehicle, and the controller may determine the position of the obstacle relative to the autonomous work vehicle based on the position of the vehicle relative to the autonomous work vehicle). Furthermore, while the obstacle detection system is disclosed above with reference to an autonomous work vehicle, the obstacle detection system may be utilized in other types of work vehicles (e.g., semi-autonomous work vehicles, manually controlled work vehicles, etc.).

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An obstacle detection system for a work vehicle, comprising:
a controller comprising a memory and a processor, wherein the controller is configured to:
receive a first signal indicative of a first current position of a detected object relative to the work vehicle;
determine a second current position of a movable object coupled to the work vehicle;
determine whether the detected object corresponds to the movable object by comparing the first current position of the detected object to the second current position of the movable object; and
output a second signal indicative of detection of the detected object in response to determining that the first current position of the detected object does not correspond to the second current position of the movable object.

2. The obstacle detection system of claim 1, wherein the movable object comprises an implement rotatably coupled to the work vehicle, and the controller is configured to determine the second current position of the implement based at least in part on a steering angle of the work vehicle.

3. The obstacle detection system of claim 1, comprising a movable object sensor configured to output a third signal indicative of the second current position of the movable object relative to the work vehicle, and the controller is configured to determine the second current position of the movable object based at least in part on the third signal.

4. The obstacle detection system of claim 1, wherein the controller is configured to generate a bounding polytope around the movable object based at least in part on dimensions of the movable object, the controller is configured to determine a third current position of the bounding polytope, and the controller is configured to determine whether the first current position of the detected object corresponds to the second current position of the movable object based at least in part on the third current position of the bounding polytope.

5. The obstacle detection system of claim 4, wherein the controller is configured to determine the third current position of the bounding polytope based at least in part on a steering angle of the work vehicle, feedback from a sensor configured to output a third signal indicative of the second current position of the movable object, or a combination thereof.

6. The obstacle detection system of claim 1, wherein the controller is configured to identify the detected object in response to determining that the first current position of the detected object does not correspond to the second current position of the movable object.

7. The obstacle detection system of claim 1, comprising a sensor assembly communicatively coupled to the controller, wherein the sensor assembly is configured to output the first signal indicative of the first current position of the detected object relative to the work vehicle.

8. The obstacle detection system of claim 1, wherein the second signal indicative of detection of the detected object comprises instructions to a movement control system of the work vehicle to avoid the detected object.

9. The obstacle detection system of claim 8, wherein the movement control system comprises a speed control system, a steering control system, or a combination thereof.

10. An obstacle detection system for a first work vehicle system, comprising:
   a controller comprising a memory and a processor, wherein the controller is configured to:
      output a first signal to a movement control system of the first work vehicle system indicative of instructions to direct the first work vehicle system along a first route through a field, wherein the first route is based on a plan;
      receive a second signal indicative of a position of an obstacle relative to the first work vehicle system;
      determine whether the position of the obstacle corresponds to a position of a second work vehicle system following a second route through the field, wherein the second route is based on the plan; and
      output a third signal indicative of detection of the obstacle in response to determining that the position of the obstacle does not correspond to the position of the second work vehicle system.

11. The obstacle detection system of claim 10, wherein the second work vehicle system comprises a work vehicle and an implement coupled to the work vehicle.

12. The obstacle detection system of claim 10, wherein the controller is configured to generate a bounding polytope around the second work vehicle system based at least in part on dimensions of the second work vehicle system, the controller is configured to determine a position of the bounding polytope, and the controller is configured to determine whether the position of the obstacle corresponds to the position of the second work vehicle system based at least in part on the position of the bounding polytope.

13. The obstacle detection system of claim 12, wherein the controller is configured to determine the position of the bounding polytope based at least in part on the second route, a fourth signal indicative of the position of the second work vehicle system, or a combination thereof.

14. The obstacle detection system of claim 10, wherein the controller is configured to identify the obstacle in response to determining that the position of the obstacle does not correspond to the position of the second work vehicle system.

15. The obstacle detection system of claim 10, wherein the third signal indicative of detection of the obstacle comprises instructions to the movement control system of the first work vehicle system to avoid the obstacle.

16. One or more tangible, non-transitory, machine-readable media comprising instructions configured to cause a processor to:
   receive a first signal indicative of a first current position of a detected object relative to a work vehicle;
   receive a second signal indicative of a second current position of a movable object coupled to the work vehicle;
   determine whether the detected object corresponds to the movable object by comparing the first current position of the detected object to the second current position of the movable object; and
   output a third signal indicative of detection of the detected object in response to determining that the first current position of the detected object does not correspond to the second current position of the movable object.

17. The one or more tangible, non-transitory, machine-readable media of claim 16, wherein the instructions are configured to cause the processor to:
   generate a bounding polytope around the movable object based at least in part on dimensions of the movable object;
   determine a third current position of the bounding polytope; and
   determine whether the first current position of the detected object corresponds to the second current position of the movable object based at least on the third current position of the bounding polytope.

18. The one or more tangible, non-transitory, machine-readable media of claim 17, wherein the instructions are configured to cause the processor to determine the third current position of the bounding polytope based at least in part on a steering angle of the work vehicle, feedback from a sensor configured to output the second signal indicative of the position of the movable object, or a combination thereof.

19. The one or more tangible, non-transitory, machine-readable media of claim 16, wherein the instructions are configured to cause the processor to identify the detected object in response to determining that the first current position of the detected object does not correspond to the second current position of the movable object.

20. The one or more tangible, non-transitory, machine-readable media of claim 16, wherein the third signal indicative of detection of the detected object comprises commands to a movement control system of the work vehicle to avoid the detected object.

* * * * *